United States Patent
Sakamoto

(10) Patent No.: US 7,177,067 B1
(45) Date of Patent: Feb. 13, 2007

(54) COLOR ELECTRONIC PAPER DISPLAY DEVICE

(75) Inventor: Michiaki Sakamoto, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 11/495,456

(22) Filed: Jul. 31, 2006

(30) Foreign Application Priority Data

Aug. 1, 2005 (JP) .............................. 2005-223514

(51) Int. Cl.
G02B 26/00 (2006.01)
G09G 3/34 (2006.01)

(52) U.S. Cl. ..................... 359/296; 345/107; 430/37

(58) Field of Classification Search ................ 359/237, 359/296, 665; 345/107, 108; 430/37, 38, 430/19, 107
See application file for complete search history.

(56) References Cited

FOREIGN PATENT DOCUMENTS

| JP | 8-29811 | 2/1996 |
|---|---|---|
| JP | 2003-177429 | 6/2003 |
| JP | 2004-294273 | 10/2004 |

OTHER PUBLICATIONS

Shin-Tson Wu et al., Reflective Liquid Crystal Displays,Wiley, SID pp. 4 to 13.

*Primary Examiner*—Timothy Thompson
(74) *Attorney, Agent, or Firm*—Young & Thompson

(57) ABSTRACT

A color electronic paper display device is provided which is easy to fabricate and can provide bright display. The color electronic paper display device includes a CF (Color Filter)-formed TFT (Thin Film Transistor) substrate in which a concave/convex layer is formed and reflecting electrode controlling TFTs and pixel electrode controlling TFTs are arranged on a glass substrate and reflecting electrodes are formed on the concave/convex layer and a colored layer made up of color filters each being for one color out of RGB (Red, Green, Blue) is formed, and each of comb-teeth shaped pixel electrodes is formed in a position corresponding to a color filter for one color, an EPD (Electrophoretic Display Device) film laminated onto an upper surface of the TFT substrate having a plurality of microcapsules making up electrophoretic elements spreading within the EPD film, and a facing substrate laminated onto an upper surface of the EPD film.

14 Claims, 6 Drawing Sheets

COLOR ELECTRONIC PAPER DISPLAY DEVICE

BACKGROUND OF THE INVENTION

1. Field of the Invention

The present invention relates to a reflective-type color electronic paper display device to achieve color display by using an electrophoretic display device (EPD).

The present application claims priority of Japanese Patent Application No. 2005-223514 filed on Aug. 1, 2005, which is hereby incorporated by reference.

2. Description of the Related Art

In recent years, research and development of an electronic paper display to be used as a display device which enables an action of "reading" without being subject to stresses, such as electronic books and electronic newspapers, is progressing. Requirements of an electronic paper display device are that it is thin, lightweight, durable (hard to crack), and easy to view (read) the same contents as printed ones. It is also required that, as the color displayed contents increases, such the electronic paper display also can display contents in colors. As the color electronic paper display device that can satisfy these various requirements, a reflective-type color display device requiring no backlight and being able to reduce power consumption can be suitably used.

As such the reflective-type color display device as described above, a reflective-type liquid crystal display device disclosed in, for example, Non-patent Reference 1 (Reflective Liquid Crystal Display, Wiley, SID, pages 4 to 13) is known. However, the disclosed reflective-type liquid crystal display has a problem in that the liquid crystal display device exhibits too narrow directivity of light, that is, due to the use of a metal electrode having a flat surface as a reflective plane, its displayed contents look bright in a limited direction determined by a direction of incident light, however, the displayed contents look dark in a direction other than the specified direction. Additionally, the disclosed reflective-type liquid crystal display device has another problem in that, due to its use of a polarization mode of light, chromatic dispersion of light is made wide and a white color cannot look like white and that, due to its use of a polarizer, the efficiency of exploiting light is low, causing a white color to become dark; in other words, the problem is that perfect paper-white display required in electronic paper is difficult.

On the other hand, as the reflective display device without polarizer, an EPD that uses electrophoretic elements is known. In the following, the EPD that uses microcapsule-type electrophoretic elements is described by referring to FIG. 4.

FIG. 4 is a diagram schematically showing an example of cross-sectional configurations of a conventional monochromatic EPD active matrix display device. As shown in FIG. 4, the monochromatic EPD active matrix display device includes a facing substrate 1, an EPD film 2 which is a film-like electrophoretic display device, and a TFT (Thin Film Transistor) glass substrate 3.

The facing substrate 1 is so configured that a facing electrode 12 made of a transparent conductive film is formed on an inner surface of a transparent plastic substrate 11 made of, for example, polyethylene terephthalate (PET) or a like. The facing substrate 1 may be made of a glass substrate instead of the PET substrate 11.

The EPD film 2 is formed so as to be film-shaped and includes microcapsules 13 which spread all inside of the EPD film 12 and a binder 14 made of a polymer filled among the microcapsules 13 with the purpose of binding these microcapsules 13. Each of the microcapsules 13 attains the size of about 40 μm and a solvent 15 made of isopropyl alcohol (IPA) or a like is hermetically encapsulated inside each of the microcapsules 13. In the solvent 15, white particles 16 each having a nano-level size and being a titanium oxide white pigment and black particles 17 each also having a nano-level size and being a carbon black pigment are floating in a dispersed manner. Each of the white particles 16 has a negatively (−) charged polarity and each of the black particles 17 has a positively (+) charged polarity.

The TFT glass substrate 3 has a four-layer structure. In the first layer nearest to the EPD film 2 is formed a plurality of pixel electrodes P1.1, P2.1, P3.1, . . . . The second and third layers are made up of insulating layers each containing a plurality of TFTs T1.1, T2.1, T3.1, . . . with each TFT corresponding to any one of pixel electrodes P1.1, P2.1, P3.1, . . . in a one-to-one relationship. In the second layer are formed drains (D) and sources (S) each corresponding to any one of the TFTs T1.1, T2.1, T3.1, . . . in a one-to-one relationship. In the third layer are formed gates (G) each corresponding to any one of the TFTs T1.1, T2.1, T3.1, . . . in a one-to-one relationship. The source (S) of each of the TFTs is connected to a corresponding pixel electrode P1.1, P2.1, P3.1, . . . . The fourth layer serving as the lowest layer is a base-body layer made of glass which is formed so as to support the first to three layers in an integrated manner.

In FIG. 4, when a plus (+) voltage is applied to the pixel electrodes P1.1 and P2.1 through the TFTs T1.1 and T2.1, respectively, since the white particles 16 contained in each of the respective microcapsules 13 are attracted and gathered, in relatively higher amounts, toward the pixel electrodes P1.1 and P2.1 and black particles 17 contained in each of the respective microcapsules 13 are attracted and gathered, in relatively higher amounts, toward the facing electrode 12 and, when a minus (−) voltage is applied to the pixel electrode P3.1 through the TFT T3.1, since the black particles 17 contained in each of the respective microcapsules 13 are attracted and gathered, in relatively higher amounts, toward the pixel electrode P3.1 and the white particles 16 contained in each of the respective microcapsules 13 are attached and gathered, in relatively higher amounts, toward the pixel electrode P3.1 and the white particles 16 contained in each of the respective microcapsules 13 are attracted and gathered, in relatively higher amounts, toward the facing electrode 12. For this effect, an image made up of white and black is displayed on the facing electrode 12 side. Thus, in the EPD active matrix display shown in FIG. 4, by applying either a plus (+) voltage or a minus (−) voltage to the pixel electrodes, the white and black image can be displayed on the facing electrode 12 side.

FIG. 5 is a diagram schematically showing an example of cross-sectional configurations of a conventional color EPD active matrix display device. As shown in FIG. 5, the color EPD active matrix display device includes a CF (Color Filter) glass facing substrate 4 having color filters, a film-like EPD film 2, and a TFT glass substrate 3 which has TFTs T1.1, T2.1, T3.1, . . . . Out of these components, configurations of the EPD film 2 and TFT glass substrate 3 are the same as employed in the case of the monochromatic EPD active matrix display shown in FIG. 4 and their detailed descriptions are omitted accordingly.

The CF glass facing substrate 4 is made up of a colored layer 22 having red (R), green (G), and blue (B) resists formed sequentially on the inner surface of a transparent glass substrate 21 and a facing electrode 23 made up of a transparent conductive film. In this case, for example, the light transmitted through the Green (G) colored layer 22 is reflected by the respectively microcapsules 13, which are placed on the pixel electrode P3.1, being put in a state of displaying white, and then travels into a person's eye through the Green colored layer 22, Thus, the green color is recognized.

In the color display having the structure shown in FIG. 5, in order to exactly control each color, it is necessary to perform precise positioning between the color filter for each color making up the colored layer 22 in the CF glass facing substrate 4 and the TFT corresponding to each color in the TFT glass substrate 3, with accuracy of, for example, 5 µm or so.

In the CF glass facing substrate 4, since the glass substrate 21 is used which can provide a strong structure, precise positioning between the CF glass facing substrate 4 and the TFT glass substrate 3 is feasible. However, if the glass substrate 21 is to be replaced with a plastic substrate for reduction of costs, it is impossible to maintain precise positioning between the color filter made of a soft plastic which can deform and the TFT glass substrate 3 with accuracy of 5 µm or so.

FIG. 6 is a diagram showing an example of a cross-sectional configuration of a conventional color EPD active matrix display device in which a film-like color filter substrate is employed. As shown in FIG. 6, the color EPD active matrix display device includes a CF (color filter) plastic facing substrate 5 having color filters, a protecting layer 6 having an adhesive layer 26, a transparent plastic layer 27, a facing electrode 28, an EPD film 2 having electrophoretic elements (microcapsules and binder), and a TFT glass substrate 3 having TFTs T1.1, T2.1, T3.1, . . . . Out of these components, configurations of the EPD film 2 and the TFT glass substrate 3 are the same functions as employed in the case of the monochromatic EPD active matrix display shown in FIG. 4 and their detailed descriptions are omitted accordingly.

The CF plastic facing substrate 5 having a film-like structure is made up of a colored layer 25 in which color filters made up of resists each being for red (R), green (G), and blue (B) are arranged sequentially on the inner surface of a transparent substrate (PET substrate) 24. The protecting layer 6 is made up of the adhesive layer 26 with which the CF plastic facing substrate 5 is laminated, the transparent plastic substrate 27 serving as a supporting substrate, and the facing electrode 28 made of a transparent conductive film.

The color EPD active matrix display shown in FIG. 6 is assembled by overlaying the CF plastic facing substrate 5 on the EPD film 2, however, it is difficult to laminate the CF plastic facing substrate 5 made of a plastic resin directly on the EPD film 2 with precise and direct positioning between the film-like CF plastic facing substrate 5 and the EPD film 2 and, therefore, a method is conventionally adopted in which the CF plastic facing substrate 5 is laminated, in advance, with the protecting layer 6 for reinforcement. To solve this problem, the protecting layer 6 requires the adhesive layer 26 with which the CF plastic facing substrate 5 is to be laminated and, in order to make the CF plastic facing substrate 5 have the same mechanical strength as can be obtained if the glass facing substrate is adopted, the formation of the plastic substrate 27 having a sufficient thickness to serve as the supporting layer in the protecting layer 6 is needed. To achieve this, it is necessary that the protecting layer 6 has a thickness of 50 µm to 100 µm.

In FIG. 6, an example of displaying red (R) by the color EPD active matrix display device having such structures as described above is shown. In the case of the structure shown in FIG. 6, since the protecting layer 6 is thick, the distance between each of the microcapsules 13 and colored layer 25 in the CF plastic facing substrate 5 increases. For this reason, all the incident light through the Red colored layer 25 is been reflected by the microcapsules 13 in a state of displaying white, and then do not go out again through the Red colored layer 25, but a part of the light passes through the Green colored layer, as a result, causing great attenuation and enabling almost no transmission of the light.

If it is now assumed that a pixel element for a single color is 80 µm in width and 240 µm in length and a color pixel for three colors of red (R), green (G), and blue (B) being 240 µm in width and 240 µm in length, which is obtained by arranging the above pixel element, is to be formed, in the case of the Red colored layer, a boundary region of 20 µm between the Red and Green colored layers and also a boundary region of 20 µm between the Blue and Red colored layers are regions that cannot be effectively used and a width of the region of the color pixel that can be effectively used is 80 µm−20 µm (R-G)−20 µm (R-B)=40 µm and, as a result, transmission factor of each of the RGB colors through the color filter is ½ of the entire. Therefore, reflection factor of white light, in the case of monochromatic display, is 40% in comparison with the reflection factor of a standard white plate, while transmission factor of each of the RGB color light components through color filters is ½ and, as a result, in the case of color display, the rate of light components, out of all incident light, that can be effectively used is 40%×½×½=10%, which causes an extremely dark display.

As described above, the conventional color electronic paper display device that adopts the film-like color filter substrate as shown in FIG. 6 has the following problems.

(1) It is necessary that the CF plastic facing substrate 5 and the TFT glass substrate are put in precise and fine alignment. However, it is difficult to put the CF plastic facing substrate 5 made of a soft plastic resin and the TFT glass substrate 3 made of glass in precise alignment with accuracy of 5 µm or so. As a result, the thick protecting layer 6 has to be formed to reinforce the CF plastic facing substrate 5 additionally.

(2) Since the thickness of the protecting layer 6 is increase, the distance between the colored layer 25 and each of the microcapsules 13 increases and a phenomenon occurs in which all incident light from, for example, the Red colored layer cannot go out through the Red colored layer and part of the light components goes out through the Green and Blue colored layers, thus causing extreme low reflection factor of color light in comparison with reflection factor of white light.

Moreover, a conventional liquid crystal display device, as a display device related to the above color electronic paper display device, is disclosed in Patent Reference 1 (Japanese Patent Application Laid-open No. 2003-177429) in which a liquid crystal is driven by an electric field, which is in parallel to a substrate, generated by forming a color filter layer and a liquid crystal layer on a TFT with a liquid crystal filter layer overlain on the color layer and by forming a transparent facing substrate on the liquid crystal layer.

Also, a charged-state detecting apparatus is disclosed in Patent Reference 2 (Japanese Patent Application Laid-open No. 2004-294273) which has an electronic paper display device to display at least one portion in a charged state out of portions in a non-charged state, positively charged state, or negatively charged state of a substance by a color being different from the color that shows a portion in other charged state.

Furthermore, a liquid crystal display device is disclosed in Patent Reference 3 (Japanese Patent Application Laid-open No. Hei 8-9811) which has a two-layer liquid crystal in which a Guest Host (GH)-type Polymer Dispersed Liquid Crystal (PDLC) layer of a first substrate is configured so as to face the GH-type PDLC layer of a second substrate.

SUMMARY OF THE INVENTION

In view of the above, it is an object of the present invention to provide a color electronic paper display device which can be fabricated easily without a need for precise and fine alignment of its components and is capable of providing high light reflection factor and of achieving bright display.

According to a first aspect of the present invention, there is provided a color electronic paper display device including:

a color-filter-formed TFT (Thin Film Transistor) substrate in which an organic film layer is formed on a TFT substrate having a plurality of reflecting electrode controlling transistors and a plurality of pixel electrode controlling transistors each formed on its upper surface and in which reflecting electrodes comprising metal films are formed on the organic film layer, which each are connected to a corresponding one of the reflecting electrode controlling transistors and a colored layer is formed in which color filters each being for one color out of three colors of red (R), green (G), and blue (B) are arranged in order of the red (R), green (G), and blue (B) in a position corresponding to each of the reflecting electrodes formed on the organic film layer and partially on the reflecting electrodes and in which each of comb-teeth shaped pixel electrodes comprising transparent conductive films is formed on the colored layer in a position corresponding to a color filter for one color, which each are connected to a corresponding one of the pixel electrode controlling transistors;

an EPD (Electrophoretic Display device) film being of a film-like shape laminated onto an upper surface of the color-filter-formed TFT substrate in which a plurality of microcapsules making up electrophoretic elements spreads within the EPD film and is sealed together with a binder; and a transparent facing substrate laminated on an upper surface of the EPD film and having a facing electrode on its lower surface.

According to a second aspect of the present invention, there is provided a color electronic paper display device including:

a color-filter-formed TFT (Thin Film Transistor) substrate in which an organic film layer is formed on a TFT substrate having a plurality of reflecting electrode controlling transistors and a plurality of pixel electrode controlling transistors each formed on its upper surface and in which reflecting electrodes comprising metal films are formed on the organic film layer, which each are connected to a corresponding one of the reflecting electrode controlling transistors by a first via hole formed in such a manner to pass through the organic film layer and a colored layer is formed in which color filters each being for one color out of three colors of red (R), green (G), and blue (B) are arranged in order of the red (R), green (G), and blue (B) in a position corresponding to each of the reflecting electrodes formed on the organic film layer and partially on the reflecting electrodes and in which each of comb-teeth shaped pixel electrodes comprising transparent conductive films is formed on the colored layer in a position corresponding to a color filter for one color, which each are connected to a corresponding one of the pixel electrode controlling transistors, by a second via hole formed in such a manner to pass through the organic film layer;

an EPD (Electrophoretic Display device) film being of a film-like shape laminated onto an upper surface of the color-filter-formed TFT substrate in which a plurality of microcapsules making up electrophoretic elements spreads within the EPD film and is sealed together with a binder; and a transparent facing substrate laminated on an upper surface of the EPD film and having a facing electrode on its lower surface.

In the foregoing first and second aspects, a preferable mode is one wherein the TFT substrate comprises a glass board, and the transparent facing substrate comprises a plastic board.

Also, a preferable mode is one wherein uneven surface is formed on an upper face of the organic film layer.

Also, a preferable mode is one wherein each of the reflecting electrodes formed by performing patterning and etching operations on each of the metal films formed on the organic film layer has approximately a same size as the color filter for each color making up the colored layer.

Also, a preferable mode is one wherein each of the comb-teeth shaped pixel electrodes includes two or more pieces of conductive lines arranged in parallel to one another at specified intervals on the color filter for each color and is configured so that a base portion of each of the conductive lines is gathered together to be connected to the pixel electrode controlling transistors.

Also, a preferable mode is one wherein a diameter of each of the microcapsules is larger than a sum of a width of each of the conductive lines making up the comb-teeth shaped pixel electrodes and a pitch among the conductive lines.

Furthermore, a preferable mode is one wherein the metal films are made of aluminum (Al).

With the above configuration, the color filters are formed on the TFT substrate and, therefore, simply by laminating the EPD film and facing substrate on the color filters, easy fabrication of the display device is made possible without the need for further fine alignment of the components, which can reduce costs for the fabrication. Additionally, high reflection factor of color light achieves the color electronic paper display device that can provide bright display.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. A color electronic paper display device according to the embodiment of the present invention is made up of a color-filter-formed TFT (Thin Film Transistor) substrate, an EPD (electrophoretic display device) film, and a facing substrate. The color-filter-formed TFT substrate includes a glass substrate, an organic film layer, reflecting electrodes, a colored layer, and comb-teeth shaped pixel electrodes. In an insulating layer formed on the glass substrate in the color-filter-formed TFT substrate are arranged reflecting electrode controlling TFTs and pixel electrode controlling TFTs. The organic film layer is formed on the glass substrate in the color-filter-formed TFT substrate. Reflecting electrodes made up of metal films are formed on the organic film layer, which each are connected to a corresponding one of the reflecting electrode controlling TFTs arranged on the glass substrate by a first via hole formed in such a manner to pass through the organic film layer. The colored layer is formed in which color filters each being for one color out of three colors of red (R), green (G), and blue (B) are arranged repeatedly in order of the red (R), green (G), and blue (B) in a position corresponding to each of reflecting electrodes on the organic film layer and partially on the reflecting electrodes.

Each of the comb-teeth shaped pixel electrodes made up of transparent conductive films is formed on the colored layer in a position corresponding to each of the color filters, which each are connected to a corresponding one of the pixel electrode controlling TFTs arranged on the glass substrate by a second via hole formed in such a manner to pass through the organic film layer. The EPD film laminated onto an upper surface of the TFT substrate has a plurality of microcapsules making up electrophoretic elements which spreads within the EPD film and is sealed together with binder therein. The facing substrate made up of a transparent substrate is laminated onto an upper surface of the EPD film with a facing electrode formed on its lower surface.

Embodiment

Figure 1:
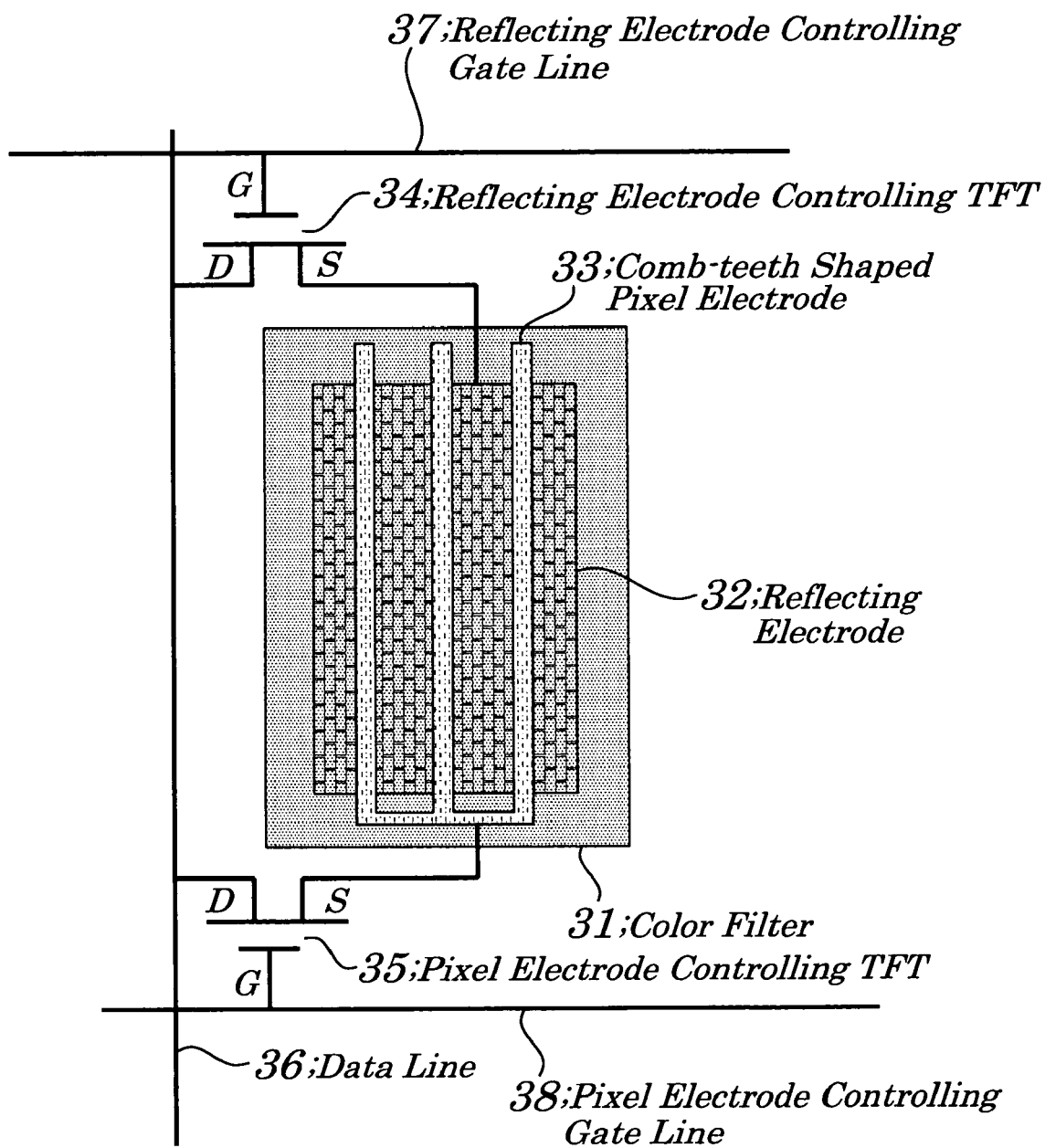
FIG. 1 is a diagram showing configurations of each pixel employed in a color electronic paper display device according to an embodiment of the present invention.
Figure 2:
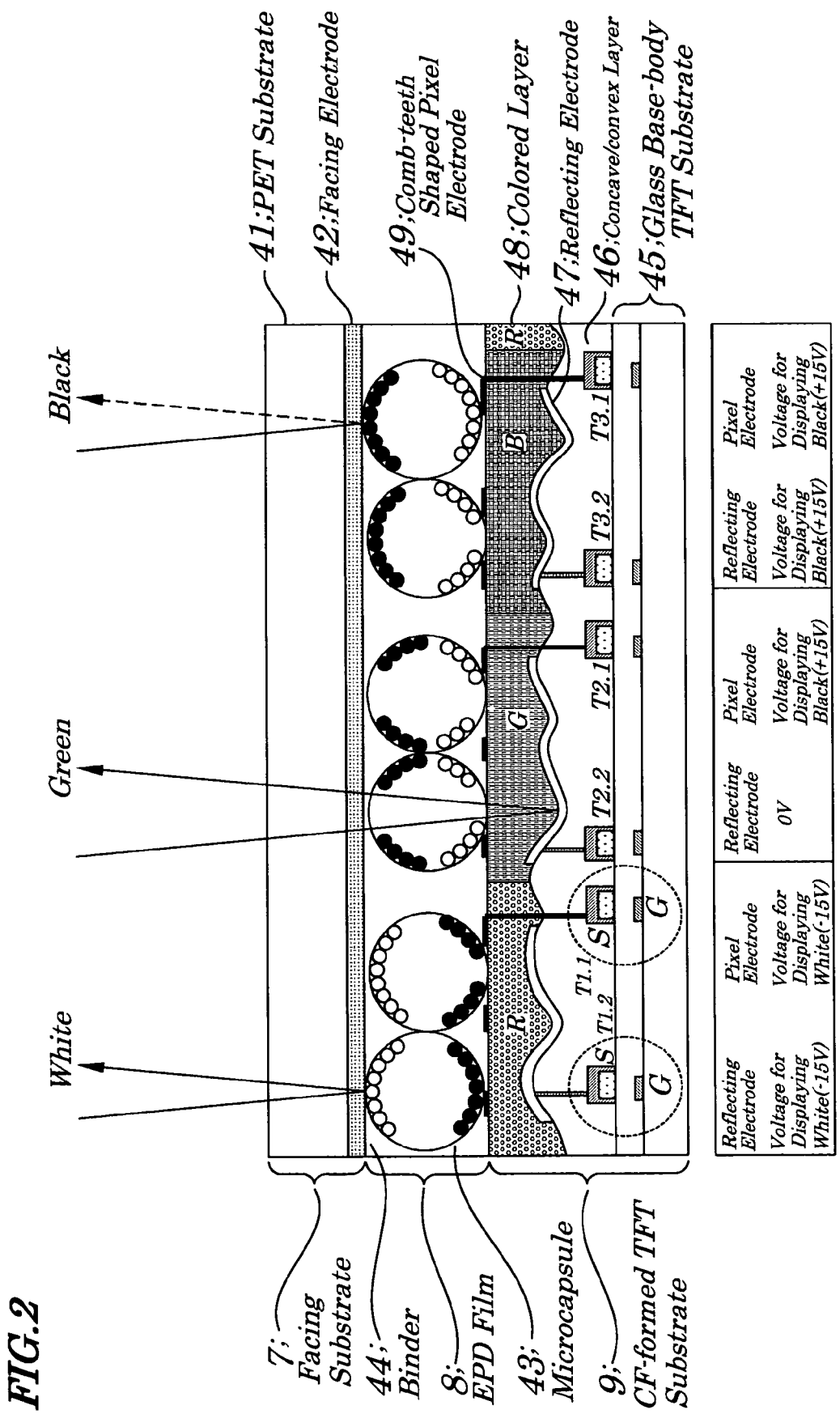
FIG. 2 is a diagram showing cross-sectional configurations of the color electronic paper display device according to the embodiment of the present invention.
Figure 3:
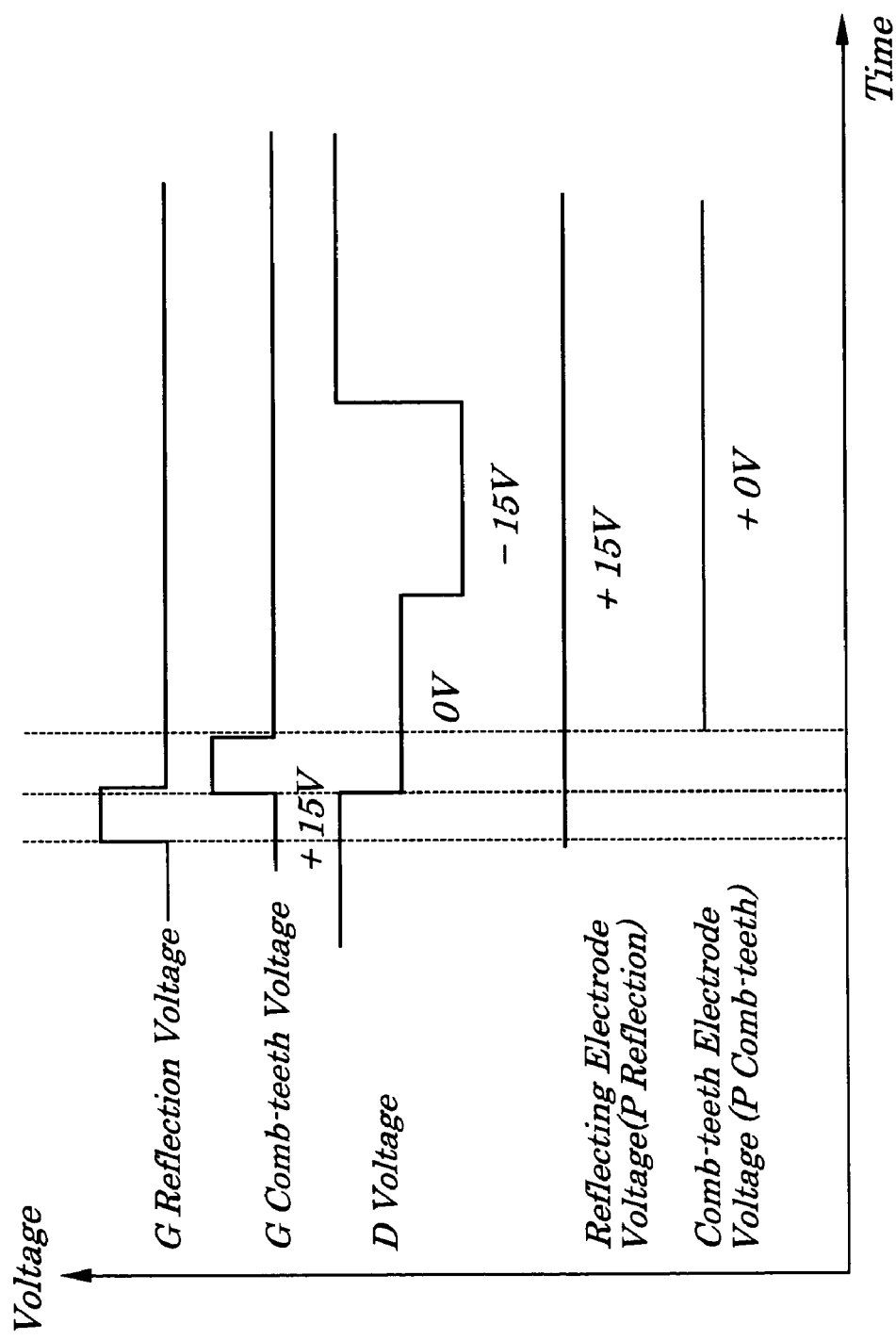
FIG. 3 is a timing chart explaining driving waveforms of the color electronic paper display device according to the embodiment of the present invention.

FIG. 1 is a diagram showing configurations of each pixel employed in a color electronic paper display device according to the embodiment of the present invention. FIG. 2 is a diagram showing cross-sectional configurations according to the color electronic paper display device of the embodiment. FIG. 3 is a timing chart explaining driving waveforms according to the color electronic paper display device of the embodiment.

As shown in FIG. 1, the color electronic paper display device of the embodiment chiefly includes color filters 31 each being for one color which makes up a colored layer 48, a reflecting electrodes 32, a comb-teeth shaped pixel electrodes 33, reflecting electrode controlling TFTs 34, pixel electrode controlling TFTs 35, a data line 36, a reflecting electrode controlling gate line 37, and a pixel electrode controlling gate line 38.

The color filters 31 are made up of resists each being formed so as to correspond to one color out of red (R), green (G), and blue (B). The reflecting electrodes 32 are formed on a lower face of the color filter 31 and an upper face portion of the reflecting electrodes 32 makes up a reflecting surface. Each of the comb-teeth shaped pixel electrodes 33 is of a comb-tooth shape and is formed on an upper face of the color filter 31. Each of the reflecting electrode controlling TFTs 34, when being ON, applies a voltage for the data line 36 to each of the reflecting electrodes 32. The pixel electrode controlling gate line 38, when being ON, applies a voltage for the data line 36 to the comb-teeth shaped pixel electrodes 33. The data line 36 supplies a specified voltage to the reflecting electrodes 32 and the comb-teeth shaped pixel electrodes 33 under control of a controlling section (not shown). The reflecting electrode controlling gate line 37 supplies a gate voltage to each of the reflecting electrode controlling TFTs 34 for ON/OFF control of each of the reflecting electrode controlling TFTs 34 under control of the controlling section (not shown). The pixel electrode controlling gate line 38 supplies a gate voltage to each of the pixel electrode controlling TFTs 35 for ON/OFF control of each of the pixel electrode controlling TFTs 35 under control of the controlling section (not shown). In FIG. 1, "D" denotes a drain, "S" a source, and "G" a gate.

Figure 4:
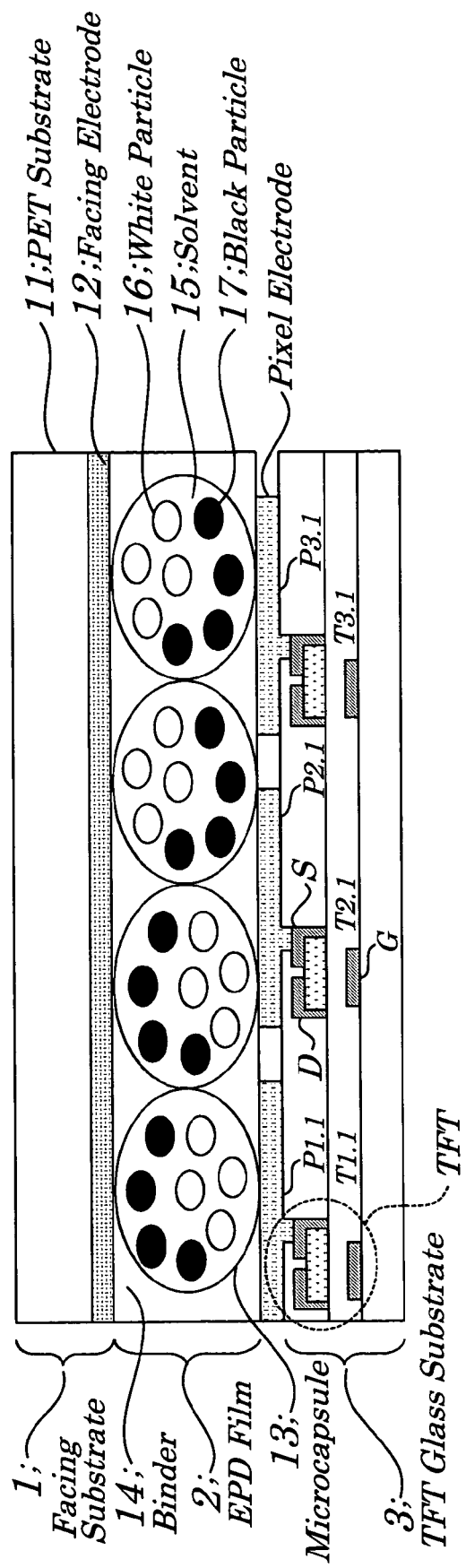
FIG. 4 is a diagram showing an example of a cross-sectional configuration of a conventional monochromatic EPD active matrix display device.
Figure 5:
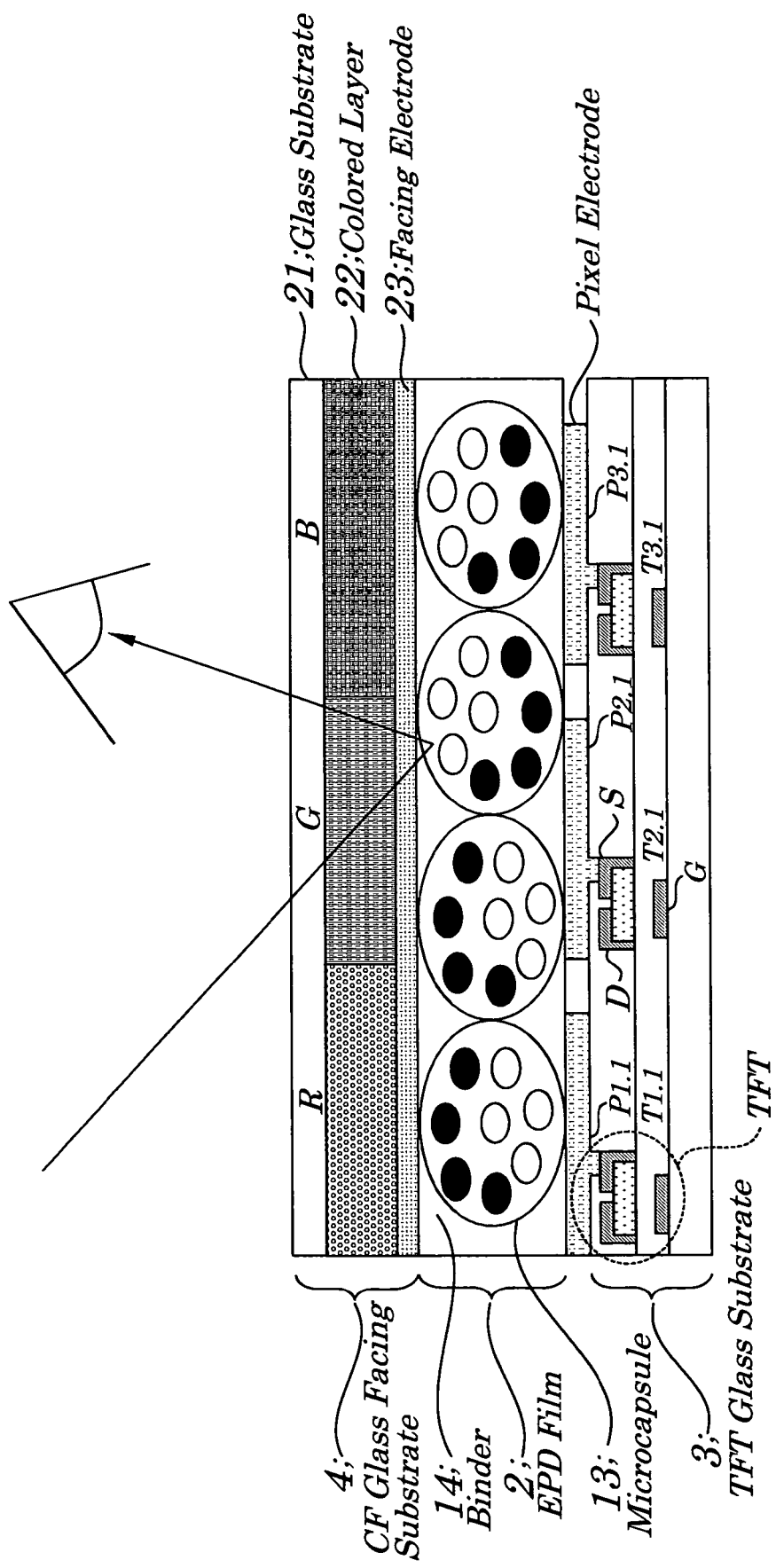
FIG. 5 is a diagram showing an example of a cross-sectional configuration of a conventional color EPD active matrix display device.
Figure 6:
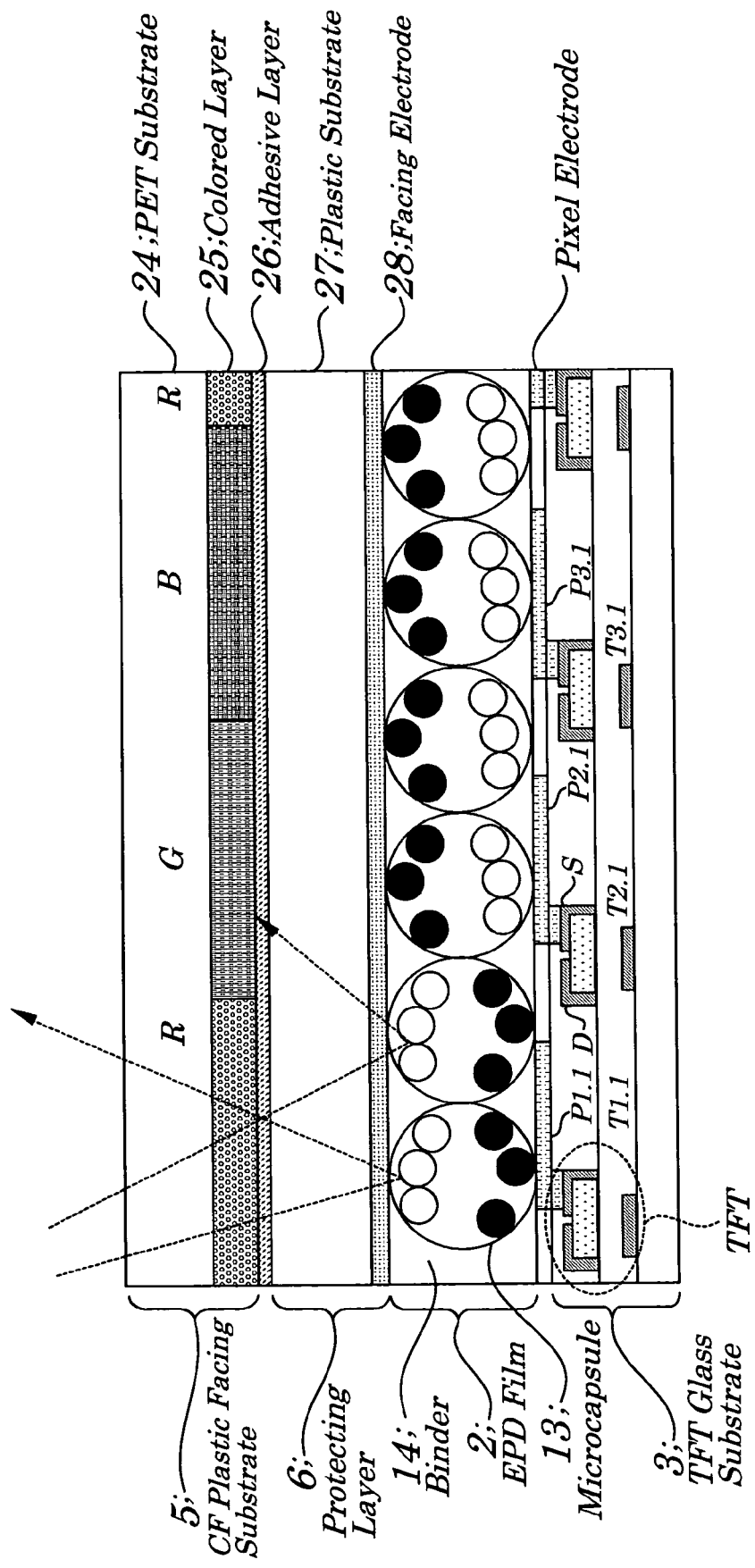
FIG. 6 is a diagram showing an example of cross-sectional configurations of a conventional color EPD active matrix display device in which a film-like color filter substrate is used.

FIG. 2 is a diagram for illustrating cross-sectional configurations of the color electronic paper display device according to the embodiment of the present invention. As shown in FIG. 2, the color electronic paper display device chiefly includes a facing substrate 7, an EPD film 8, and a CF (color filter)-formed TFT substrate 9. The facing substrate 7 is configured so as to have a facing electrode 42 made up of a transparent conductive film and formed in the inner surface side of a transparent plastic substrate (PET substrate) 41. The PET substrate 41 may be replaced with a transparent glass substrate. The EPD film 8 is formed so as to be film-shaped and includes microcapsules 43 which spread within the EPD film 8 and a binder 44 made of a polymer filled among the microcapsules 43 for the purpose of binding these microcapsules 43. Configurations of each of the microcapsules 43 are the same as those shown in FIG. 4 and their detailed descriptions are omitted accordingly.

The CF-formed TFT substrate 9 is so configured that, on a glass base-body TFT substrate 45 having the pixel electrode controlling TFTs T1.1, T2.1, T3.1, . . . , and the reflecting electrode controlling TFTs T1.2, T2.2, T3.2, . . . , arranged in a plurality of insulating layers formed on a glass substrate are sequentially formed a concave/convex layer 46 made of an organic film layer such as an acrylic resin film, reflecting electrodes 47 formed on an upper surface of the concave/convex layer 46 and made of a metal film having high reflection factor such as an aluminum (Al) film, a colored layer 48 formed by sequentially arranging color filters consisting of resists each for one color out of three colors of red (R), green (G), and blue (B) on the upper surface of the concave/convex layer 46 and partially on the reflecting electrodes 47, and the comb-teeth shaped pixel electrodes 49 made up of transparent conductive films such as an ITO film formed on an upper surface of the colored layer 48.

The concave/convex layer 46 is so configured that its concave and convex portions are formed by performing etching processes on the surface of the concave/convex layer 46 and that directivity of out-going reflected light can be decreased by making irregular reflection occur in incident light by using the each of reflecting electrodes 47 formed on the concave and convex portions. The reflecting electrodes 47 are so configured that a metal film is first formed on the concave/convex layer 46 and then patterning and etching operations are performed on the formed metal film in a position corresponding to a color filter for one color making up the colored layer 48 to divide the metal film in a manner in which a size of each of the divided metal films becomes the same as that of each of the color filters. Each of the reflecting electrodes 47 is connected to a corresponding one of the reflecting electrode controlling TFTs 34 by a first via hole formed in such a manner to pass through the concave/convex layer 46 (organic film layer). Each of the comb-teeth shaped pixel electrodes 49 has a comb-teeth shape formed in a position corresponding to a color filter for one color on upper surfaces of the colored layer 48 by using a printing method or a like and made up of a plurality of parallel conductive lines placed at specified intervals. Each of the comb-teeth shaped pixel electrodes 49 is also connected to a source side of a corresponding one of the pixel electrode controlling TFTs 35 by a second via hole formed in such a manner to pass through the concave/convex layer 46 (organic film layer), at a base portion of each conductive line combined together in each of the comb-teeth shaped pixel electrodes 49.

The color filter making up the colored layer 48 is made up of color pixels each being 240 μm in width and 240 μm in length which are constructed by arranging each pixel element for red (R), green (G), and blue (B) each being 240 μm in width and 240 μm in length. A width of a comb tooth of each of the comb-teeth shaped pixel electrodes 49 corresponding to a color filter for one color out of red (R), green (G), and blue (B) in the colored layer 48 is about 5 μm and a pitch among the comb teeth is about 25 μm. Moreover, the diameter of each of the microcapsules 43, since it is necessary that at least one comb tooth exists under each of the microcapsules 43, has to be selected in a manner to satisfy the relation given by the following expression:

(comb tooth width+comb tooth pitch)<microcapsule diameter)　　　Expression 1

The color electronic paper display device of the embodiment is achieved by laminating the EPD film 8 onto an upper surface of the CF-formed TFT substrate 9 having such configurations as described above and also by laminating the facing substrate 7 onto an upper surface of the EPD film 8. In the color electronic paper display device of the embodiment, the reflecting electrode controlling TFTs 34, pixel electrode controlling TFTs 35, color filters each being for one color which make up the colored layer 48, reflecting electrodes 47, comb-teeth shaped pixel electrodes 49 are formed on the glass base-body TFT substrate 45 in advance by positioning and patterning operations, further precise positioning among components described above is not required when the EPD film 8 is laminated onto the upper surface of the CF-formed TFT substrate 9 and also the facing substrate 7 is laminated on the upper surface of the EPD film 8.

Operations of the color electronic paper display device of the embodiment are described below.

(1) In the case of display of white:

When white is to be displayed in the color electronic paper display device, a voltage (−15V) for displaying white is applied to each of the comb-teeth shaped pixel electrodes 49 through each of the pixel electrode controlling TFTs 35 and a voltage (−15V) for displaying white is applied also to each of the reflecting electrodes 47 through each of the reflecting electrode controlling TFTs 34. As a result, since the comb-teeth shaped pixel electrodes 49 and the reflecting electrodes 47 carry a voltage for displaying white, black particles in the microcapsules 43 in the EPD film 8 are attracted and gathered toward the colored layer 48 side and white particles in the microcapsules 43 are attracted and gathered toward the facing electrode 42 side and, therefore, white is displayed when seen from the facing substrate 7 side.

(2) In the case of display of RGB colors:

When a bright RGB color display is to be performed, a voltage (−15V) for displaying white is supplied to each of the comb-teeth shaped pixel electrodes 49 and a voltage (0V) is supplied to each of the reflecting electrodes 47. When a dark color display is to be performed, a voltage (+15V) is applied to each of the comb-teeth shaped pixel electrodes 49 and a voltage (0V) is applied to each of the reflecting electrodes 47. As a result, though the comb-teeth of each of the comb-teeth shaped pixel electrodes 49 carry a voltage, since no voltage is applied among the comb teeth on an upper surface of the colored layer 48, white particles or black particles are attracted and gathered in portions of each of the microcapsules 43 placed above the comb teeth of each of the comb-teeth shaped pixel electrodes 49, however, neither white particles nor black particles are attracted and gathered in portions among the comb teeth. Due to this, in the above portions, light having come into each of the microcapsules 43 passes through the color filter of the colored layer 48 and is then reflected by a surface of each of the reflecting electrodes 47 and again goes out through the color filter and, therefore, a color of the color filter in the colored layer 48 is displayed when seen from the facing substrate 7 side. At this time point, by controlling magnitude of the voltage for displaying white or black to be applied to each of the comb-teeth shaped pixel electrodes 49, it is made possible to provide a gray-scale to a color to be displayed.

(3) In the case of display of black:

When black is to be displayed, a voltage (+15V) for displaying black is applied to each of the comb-teeth shaped pixel electrodes 49 and a voltage (+15V) for displaying black is supplied to each of the reflecting electrodes 47. As a result, since each of the comb-teeth shaped pixel electrodes 49 and each of reflecting electrodes 32 carry the voltage for displaying black, white particles in each of the microcapsules 43 in the EPD film 8 are attracted and gathered to the colored layer 48 side and, since black particles in each of the microcapsules 43 are attracted and gathered to the facing electrode 42, black is displayed when seen from the facing substrate 7 side.

Next, results of measurements of reflection factor obtained in the color electronic paper display device of the embodiment are explained. The reflection factor is measured by using spot light on condition that a light incident angle is 30° and a light outgoing angle is 0°. The obtained result is that, in the case of white and black display, as in the case of the monochromatic EPD display, the reflection factors of white light and black light is 40% and 5%, respectively, in comparison with that of a standard white plate and, therefore, contrast ratio between white light and black light is 8:1. The result obtained in the case of color display, in a state where light is allowed to transmit, by using a reflective color filter having 10% of a chromaticity region of specifications set by the NTSC (National Television System Committee) standard is that, in this chromaticity region, when a voltage for displaying white is applied to each of the comb-teeth shaped pixel electrodes, the reflection factor is 8% and, when a voltage for displaying black is applied to each of the comb-teeth shaped pixel electrodes, the reflection factor is 15%.

Thus, according to the color electronic paper display device of the embodiment, two types of electrode serving as a controlling electrode, one being the reflecting electrode and the other being the comb-teeth shaped pixel electrode, are employed and, therefore, display of three states of white, RGB, and black is made possible. Despite the use of the color filter, almost the same reflection factor and contrast ratio between white and black as obtained in the case of the monochromatic electronic paper display device is achieved.

FIG. 3 is a timing chart explaining driving waveforms of the color electronic paper display device according to the embodiment of the present invention. As shown in FIG. 3, for example, when a voltage (D voltage) of a data line is +15V, by applying a plus (+) pulse (G reflection pulse) to a gate line of each of the reflecting electrode controlling TFTs, each of the reflecting electrode controlling TFTs is turned ON and a voltage of +15V (P reflection voltage) is applied to each of the reflecting electrode controlling TFTs, which is held on the source of each of the reflecting electrode controlling TFTs. Also, when a voltage (D voltage) of a data line is 0V, by applying a plus (+) pulse (G comb-teeth pulse) to a gate line of each of the pixel electrode controlling TFTs, each of the pixel electrode controlling TFTs is turned ON and a voltage of 0 V (P comb-teeth voltage) is applied to each of the comb-teeth shaped pixel electrodes, which is held on the source side of each of the pixel electrode controlling TFTs.

In the color electronic paper display device of the embodiment of the present invention, onto the CF-formed TFT substrate 9 in which the reflecting electrodes 47, the colored layer (color filter layer) 48, and the comb-teeth shaped pixel electrodes 49 are sequentially laminated the EPD film 8 and the facing substrate 7 and, therefore, no further precise and fine alignment of its components is required for assembly of the display device, thus achieving easy fabrication of the display device. Moreover, since two types of controlling electrode, one being the reflecting electrode and the other being the comb-teeth shaped pixel electrode are connected to each of the pixels, display of three states of white, RGB, and black can be made feasible only by one pixel, which achieves the white reflection factor being as high as 40% and the contrast ratio between white and black being 8 and, since the distance between the reflecting electrodes reflecting incident light and the color filter is short, a loss of color light that goes out by reflection is small, which enables the achievement of the color electronic paper display device to provide bright display. Furthermore, the facing substrate 7 may be replaced with a plastic substrate, which enables the display device to be more lightweight. Thus, according to the embodiment, it is made easy to fabricate the color electronic paper display device that can provide bright display at low costs.

It is apparent that the present invention is not limited to the above embodiments but may be changed and modified without departing from the scope and spirit of the invention. For example, any pixel configuration of the display device can be selected for fabrication and, therefore, irrespective of varying scales of the display device, the color electronic paper display device can be realized.

Moreover, the color electronic paper display device of the present invention can be suitably used in electronic paper display devices that can display colors, such as electronic books and/or electronic newspapers.

What is claimed is:

1. A color electronic paper display device comprising:
    a color-filter-formed TFT (Thin Film Transistor) substrate in which an organic film layer is formed on a TFT substrate having a plurality of reflecting electrode controlling transistors and a plurality of pixel electrode controlling transistors each formed on its upper surface and in which reflecting electrodes comprising metal films are formed on said organic film layer, which each are connected to a corresponding one of said reflecting electrode controlling transistors and a colored layer is formed in which color filters each being for one color out of three colors of red (R), green (G), and blue (B) are arranged in order of the red (R), green (G), and blue (B) in a position corresponding to each of said reflecting electrodes formed on said organic film layer and partially on said reflecting electrodes and in which each of comb-teeth shaped pixel electrodes comprising transparent conductive films is formed on said colored layer in a position corresponding to a color filter for one color, which each are connected to a corresponding one of said pixel electrode controlling transistors;
    an EPD (Electrophoretic Display device) film being of a film-like shape laminated onto an upper surface of said color-filter-formed TFT substrate in which a plurality of microcapsules making up electrophoretic elements spreads within the EPD film and is sealed together with a binder; and
    a transparent facing substrate laminated on an upper surface of said EPD film and having a facing electrode on its lower surface.

2. The color electronic paper display device according to claim 1, wherein said TFT substrate comprises a glass board, and said transparent facing substrate comprises a plastic board.

3. The color electrode paper display device according to claim 1, wherein uneven surface is formed on an upper face of said organic film layer.

4. The color electrode paper display device according to claim 1, wherein each of said reflecting electrodes formed by performing patterning and etching operations on each of said metal films formed on said organic film layer has approximately a same size as said color filter for each color making up said colored layer.

5. The color electrode paper display device according to claim 1, wherein each of said comb-teeth shaped pixel electrodes comprises two or more pieces of conductive lines arranged in parallel to one another at specified intervals on said color filter for each color and is configured so that a base portion of each of said conductive lines is gathered together to be connected to said pixel electrode controlling transistors.

6. The color electrode paper display device according to claim 1, wherein a diameter of each of said microcapsules is larger than a sum of a width of each of said conductive lines making up each of said comb-teeth shaped pixel electrodes and a pitch among said conductive lines.

7. The color electrode paper display device according to claim 1, wherein said metal films are made of aluminum (Al).

8. A color electronic paper display device comprising:
    a color-filter-formed TFT (Thin Film Transistor) substrate in which an organic film layer is formed on a TFT substrate having a plurality of reflecting electrode controlling transistors and a plurality of pixel electrode controlling transistors each formed on its upper surface and in which reflecting electrodes comprising metal films are formed on said organic film layer, which each are connected to a corresponding one of said reflecting electrode controlling transistors by a first via hole formed in such a manner to pass through the organic film layer and a colored layer is formed in which color filters each being for one color out of three colors of red (R), green (G), and blue (B) are arranged in order of the red (R), green (G), and blue (B) in a position corresponding to each of said reflecting electrodes formed on said organic film layer and partially on said reflecting electrodes and in which each of comb-teeth shaped pixel electrodes comprising transparent conductive films is formed on said colored layer in a position corresponding to a color filter for one color, which each are connected to a corresponding one of said pixel electrode controlling transistors, by a second via hole formed in such a manner to pass through the organic film layer;

an EPD (Electrophoretic Display device) film being of a film-like shape laminated onto an upper surface of said color-filter-formed TFT substrate in which a plurality of microcapsules making up electrophoretic elements spreads within the EPD film and is sealed together with a binder; and a transparent facing substrate laminated on an upper surface of said EPD film and having a facing electrode on its lower surface.

9. The color electronic paper display device according to claim 8, wherein said TFT substrate comprises a glass board, and said transparent facing substrate comprises a plastic board.

10. The color electrode paper display device according to claim 1, wherein uneven surface is formed on an upper face of said organic film layer.

11. The color electrode paper display device according to claim 8, wherein each of said reflecting electrodes formed by performing patterning and etching operations on each of said metal films formed on said organic film layer has approximately a same size as said color filter for each color making up said colored layer.

12. The color electrode paper display device according to claim 8, wherein each of said comb-teeth shaped pixel electrodes comprises two or more pieces of conductive lines arranged in parallel to one another at specified intervals on said color filter for each color and is configured so that a base portion of each of said conductive lines is gathered together to be connected to said pixel electrode controlling transistors.

13. The color electrode paper display device according to claim 8, wherein a diameter of each of said microcapsules is larger than a sum of a width of each of said conductive lines making up each of said comb-teeth shaped pixel electrodes and a pitch among said conductive lines.

14. The color electronic paper display device according to claim 8, wherein said metal films are made of aluminum (Al).

* * * * *